J. W. MORRISON.
YARN WINDING MACHINE.
APPLICATION FILED AUG. 22, 1912.

1,117,222.

Patented Nov. 17, 1914.
7 SHEETS—SHEET 2.

J. W. MORRISON.
YARN WINDING MACHINE.
APPLICATION FILED AUG. 22, 1912.

1,117,222.

Patented Nov. 17, 1914.
7 SHEETS—SHEET 4.

WITNESSES
John C. Sanders
Albert F. Heuman

INVENTOR
JAMES WILLIAM MORRISON

J. W. MORRISON.
YARN WINDING MACHINE.
APPLICATION FILED AUG. 22, 1912.

1,117,222.

Patented Nov. 17, 1914.
7 SHEETS—SHEET 5.

WITNESSES

INVENTOR
JAMES WILLIAM MORRISON

J. W. MORRISON.
YARN WINDING MACHINE.
APPLICATION FILED AUG. 22, 1912.

1,117,222.

Patented Nov. 17, 1914.
7 SHEETS—SHEET 7.

WITNESSES.
John C. Sanders
Albert F. Heuman

INVENTOR.
James William Morrison.
BY
ATTY.

UNITED STATES PATENT OFFICE.

JAMES WILLIAM MORRISON, OF STALEYBRIDGE, ENGLAND, ASSIGNOR OF ONE-HALF TO ROBERT DUCKETT, OF STALEYBRIDGE, ENGLAND.

YARN-WINDING MACHINE.

1,117,222.   Specification of Letters Patent.   Patented Nov. 17, 1914.

Application filed August 22, 1912. Serial No. 716,390.

*To all whom it may concern:*

Be it known that I, JAMES WILLIAM MORRISON, a subject of the King of Great Britain and Ireland, residing at Bayley street, Staleybridge, in the county of Lancaster, England, have invented new and useful Improvements in Yarn-Winding Machines, of which the following is a specification.

My said invention relates to yarn winding apparatus, that is, to the class of machine for re-winding yarn such as yarn from ring frame bobbins, or from reject cops, and generally for re-winding yarn or threads.

My apparatus is intended to re-wind yarn into cops the same as, or similar to, mule cops, and mule spindles are utilized. The construction is such that the gage of the spindles is very small, a distance apart as little as 1⅛ inches being possible. Winding may be on the bare spindle, or on paper tubes, as may be desired.

I preferably make my frame in sections and I support the mule spindles in fixed rails. With respect to the spindles, I employ a movable bar or rod carried on swing arms or otherwise and having yarn guides, such bar or rod being influenced to control the building of the cops. A copping motion including a quick drop cam acts on a chain to influence the bar or rod, and I also combine with the other elements means to act on said chain to divert or affect it with the object of shortening or adding to its length and so regulating the length of chase during the process of building, and so serving as a chase regulating device. I insert a quickly laid binding thread, as in a mule wound cop, and to lay this thread in, I preferably arrange to arrest the winding-on during the time the quick drop cam puts in the binding thread. A stop motion is also provided to arrest the machine on breakage of an end, &c.

My yarn winding apparatus is hereafter fully described with reference to the attached drawings, wherein:

Figure 1 shows a side elevation of one section or length of the frame with certain parts omitted. Fig. 1ª shows a detail of Fig. 1. Figs. 9, 10 and 11 are diagrams, indicating how the copping chain is influenced to affect the action of the copping motion, and consequently the movable bar, and whereby the length of chase is regulated.

Respecting Figs. 9, 10 and 11.

In my winding apparatus I, as stated, utilize mule spindles $a$ and these are supported at two points as in fixed rails $a'$ $a^2$, the wharves $a^3$ being driven by bands from the tin roller $b$. Brackets $a^4$, $a^5$ may support the fixed rails $a'$ $a^2$ these brackets being bolted to the main frames or end castings A. I drive each tin roller through a clutch, as for example, by a conical friction clutch $b'$, the tin roller being thrust into frictional contact with the clutch on the shaft $b^2$ to effect driving of the spindles and being braked or arrested when the means which thrust in the tin roller are moved out. The shaft $b^2$ is driven by a band from the main driving shaft $c$, or otherwise and said shaft $b^2$ carries the conical clutch $b'$. A brake lever $d$ is pivoted at $d'$ and this brake lever has a curved braking surface $d^2$ with leather face $d^3$. Said brake lever has a rearward extension $d^4$ and a forward extension and handle $d^5$ projecting to the front of the frame, and has a contact piece $d^6$ which is acted on by a cam $e$ on the front shaft $f$. As this shaft $f$ revolves, it rotates the cam $e$, the periphery of which is plain save for a bite or gap $e'$. When the contact piece $d^6$ bears on the plain periphery, the forward end $d^5$ of the brake lever is elevated, and, the rearward extension $d^4$ descends against the action of a spring $d^7$ and so a weighted lever arm $g'$ fixed on the shaft $g$ is allowed to fall slightly and the shaft $g$ is rocked. On the shaft $g$ is fixed a fork $g^2$ and this fork $g^2$ thrusts the tin roller $b$ into contact with the clutch $b'$ and so the tin roller is driven. Similarly, when the contact piece $d^6$ occupies the bite $e'$ in the cam, the rearward extension $d^4$ is elevated and the lever $g'$ acted on to rock the shaft $g$ and cause such a movement of the fork $g^2$ as allows the tin roller to move out of gear. Thus, the brake lever $d$ not ony insures the disengagement of the clutch but it arrests momentum of the tin roller. The bite $e'$ in the cam $e$, is presented once during every revolution of the cam shaft $f$ and this occurs just at the time the quick drop takes place and so the binding thread is laid in by a quick descent, and, with the spindles arrested.

The main shaft $c$ is the driving shaft, as explained and this drives by means of a band $h$ from the pulley $h'$ to the pulley $h^2$ on the stud shaft $h^3$, and on said stud shaft is a spur pinion $h^4$ which meshes with the large gear wheel $f'$ on the lower front shaft $f$. This manner of driving may be obviously varied. The gear wheel $f'$ is rendered fast or loose on the shaft $f$ by means of a clutch $f^2$, worked by a clutch lever $f^3$, for a purpose to be explained later.

Figures 1, 1A:
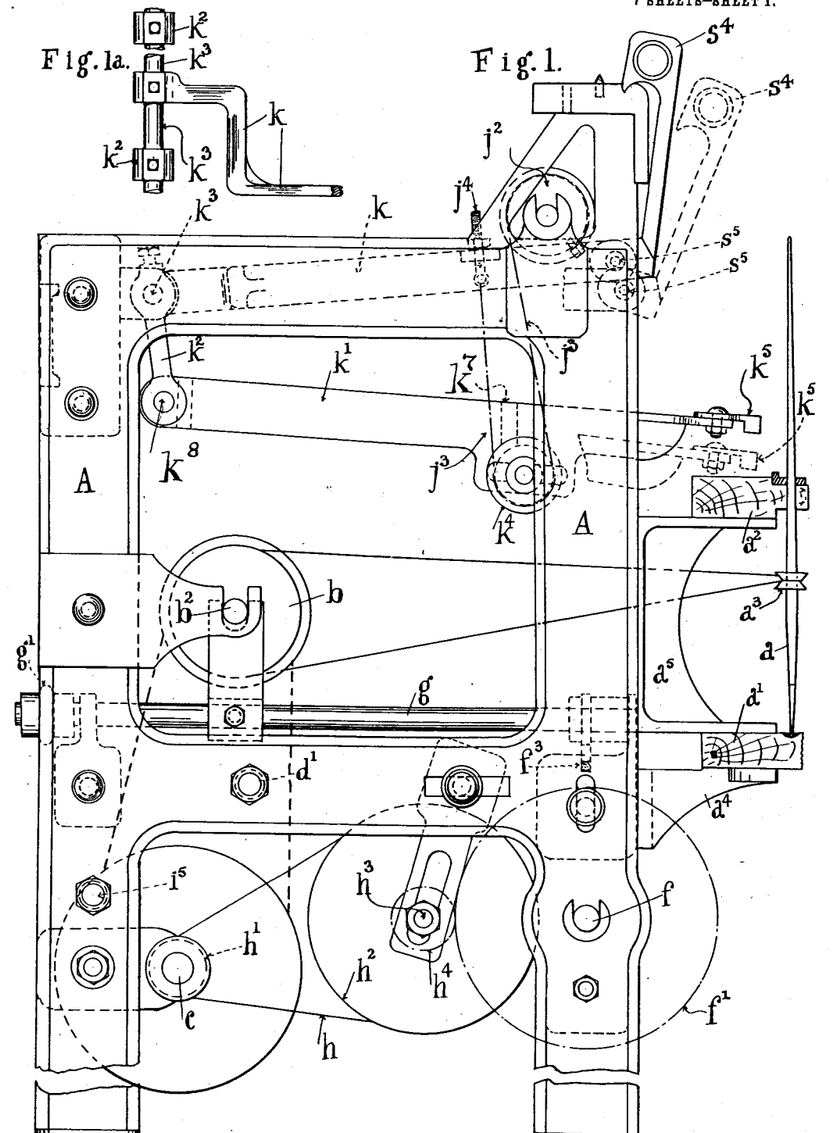
Figures 2, 3:
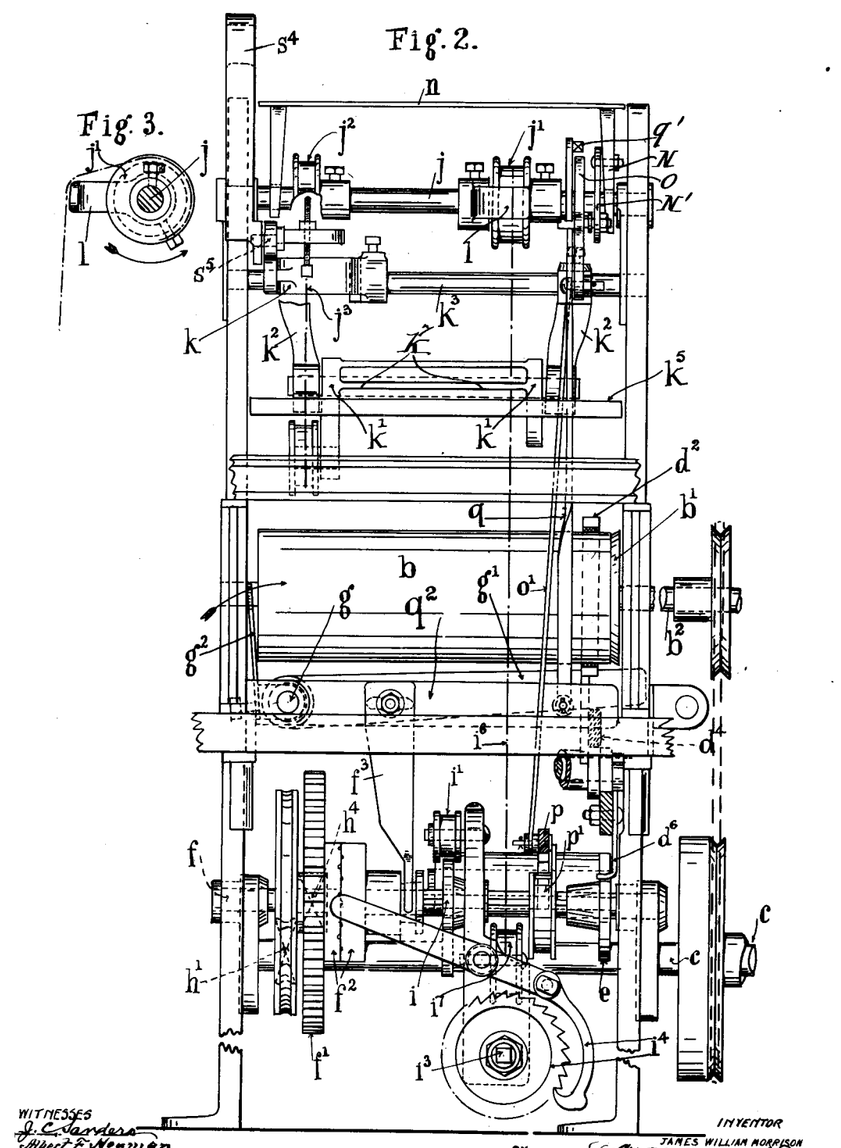
Fig. 2 is a front elevation, certain of the parts being again omitted to prevent confusion.
Fig. 3 is a detail showing the rotary chase influencing device.

On the shaft $f$ is fixed the copping cam $i$ forming part of the copping motion, the bowl $i'$ of which copping motion bears on said cam and which copping motion has the usual nut $i^2$ on the screw shaft $i^3$ slowly rotated by the usual ratchet motion $i^4$, the main copping lever being fulcrumed at $i^5$ and the chain $i^6$ passing over the usual bowl $i^7$ and then upward to indirectly influence the bar or rod $k^5$ carrying the yarn guides by reason of said chain $i^6$ acting on the pulley $j'$. The chain is attached to the drum or pulley $j'$ on the upper shaft $j$ and this shaft also carries a second drum or pulley $j^2$ which, by a chain $j^3$, suspends the swing frame mechanism supporting the movable bar or rod $k^5$ with yarn guides. This swing frame mechanism consists of an upper arm $k$ and lower braced arms $k'$ $k'$ suspended by links $k^2$ $k^2$, which links are pinned by set screws on the shaft $k^3$ (see Fig. 1ª) which shaft is supported in bearings. It will be noticed that the braced arms $k'$ $k'$ (during building) swing on the shaft $k^3$. The arm $k$ is pinned on the rock shaft $k^3$. The length of chain $j^3$ is adjustably attached at $j^4$ to a projection from the upper arm $k$ and passes under an adjustable bowl $k^4$ (carried in one of the arms $k'$) and thence onto the drum or pulley $j^2$ to which its end is attached. Thus, the swing frame mechanism counterbalances the weight of the complete copping motion. The winding-off, of the chain $i^6$ from the drum or pulley $j'$ causes the winding-on of the chain $j^3$ on the pulley $j^2$, with consequent gradual raising of the yarn bar or rod $k^5$, while the rocking of the shaft $j$ due to the copping motion vibrates the yarn guide bar $k^5$ with respect to the mule spindles and so controls the building of the cops.

Figure 9:
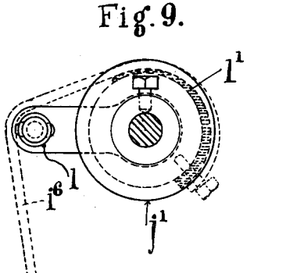
Fig. 9 shows the chase regulating device acting as a shortening motion and influencing the chase as at the commencement of a set of cops, the chase indicated being the minimum one when starting the bottom.
Figure 10:
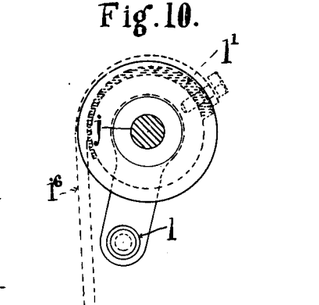
Fig. 10 shows the position when the cop bottom is fully formed, the chase regulating device having moved to such an extent that it has ceased to influence the chain and so the chase is at its longest.
Figure 11:
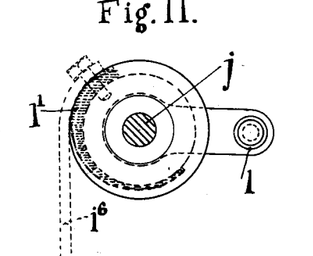
Fig. 11 indicates the cop as when fully wound, a nosing device (carried on the chase regulating barrel) having gradually come into action to influence the chase to slightly shorten same as the cops approach completion and the nose is formed and to conpensate for the gradually decreasing diameter of the spindles.
Figure 12:
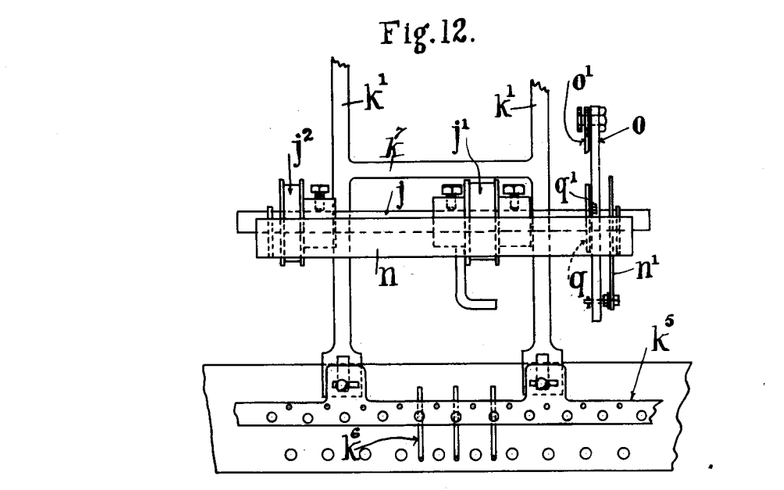
Fig. 12 is a detail plan view of the swinging bar or rod carrying the yarn guides, and also showing the chain barrels and supporting shaft and part of the stop motion mechanism.
Figure 13:
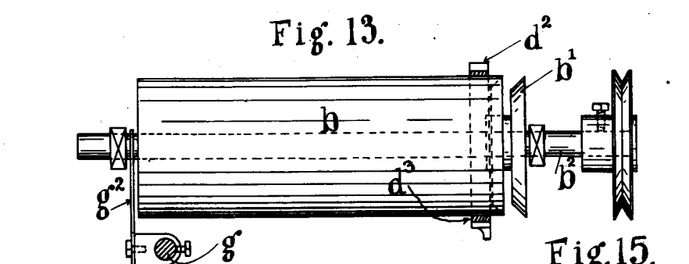
Fig. 13 shows the tin roller and its clutch gear, &c.
Figure 14:
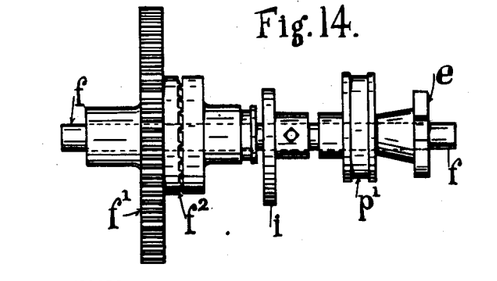
Figs. 14 and 15 are detached detail views showing the cam shaft, cams, the clutch, &c.
Figure 15:
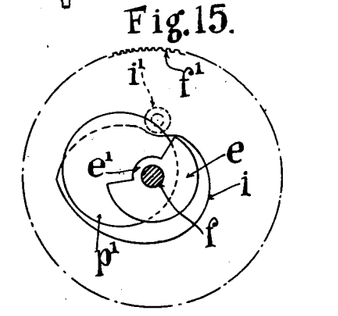

Were no mechanism interposed, the copping motion and mechanism described would give a uniform chase, with a quick drop and an arrest of the spindles during the quick drop. I therefore combine or include a chase regulating device, or devices, in order to be able to regulate the chase at will, and this takes the form of a chain deflecting device $l$ secured to the rotatable shaft $j$ and capable of being adjusted or set as required. When commencing to build, this device $l$ deflects the chain $i^6$ (see Fig. 9) and so shortens the chain and diminishes the length of the chase proportionately with the amount the chain is deflected. As the cop bottom progresses or is built-up, the length of chase is gradually increased, until such time as the device $l$ (due to rotary movement) gradually ceases to influence the chase as the cop bottom is fully formed (see Fig. 10). Correspondingly I may gradually shorten the chase, or compensate for decrease in diameter of the mule spindles, by applying a curved and inclined nosing piece or chase regulator $l'$ fixed to the drum or pulley $j'$ which gradually comes into action as the cop approaches completion, and this is well shown by Fig. 11. The yarn is directed onto the spindles by suitable yarn guides, as for example the yarn guides $k^6$ adjustably fixed in the bar or rod $k^5$.

A stop-motion is requisite to stop the machine when an end breaks. This motion is controlled from the copping cam shaft $f$.

Each yarn or end passes over a pivoted finger $m$ hung or pivoted on a bar at $m'$, on a support $m^9$, and, the tension of the yarn normally depresses the forward end of such finger, and, causes the rear end to keep elevated, small drop-wires $m^3$. Below said drop wires is an oscillating bar $n$ supported around the shaft $j$ and rocked thereon. The oscillating bar $n$ has a lever arm $n'$ connected thereto, and, to this lever arm, is jointed at $n^2$, a cranked lever $o$ which is acted on by the connecting rod $o'$ jointed at $o^2$ to the pivoted lever $p$ pivoted about $i^5$. The pivoted lever $p$ is acted upon by a cam $p'$ on the cam shaft $f$, and, as said cam $p'$ revolves, the oscillating bar $n$ is vibrated below the drop wires $m^3$. So long as the drop wires remain elevated, the oscillating bar is partially rocked around the shaft $j$ moving on that shaft which acts as a support, the cranked lever $o$ when acted on by the connecting rod $o'$ merely swinging or rocking the oscillating bar $n$ below the drop wires. As soon however as an end breaks, the particular drop wire is lowered and obstructs the oscillating bar $n$ and resists its swinging, and, therefore, the cranked lever $o$ now turns on the fulcrum $n^2$ and acts on a projecting stud $q'$ attached to a second connecting rod $o$ and so compels movement or elevation of the latter. The result of this is, that the connecting rod $q$ acts on the lever $q^2$ and consequently on the clutch lever $f^3$, which it rocks, and so disengages the clutch box $f^2$ and stops the driving of the cam shaft $f$. The cams $p'$ and $e$, are so timed, that the clutch is disengaged about the time the tin roller $b$ would be disengaged and braked, as is obvious.

Figure 5:
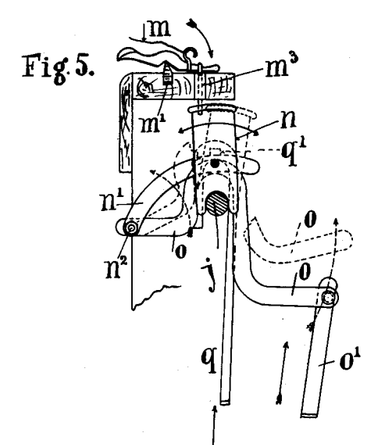
Figs. 5 and 6 are detail views indicating the stop motion.
Figure 6:
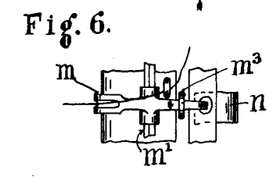
Figure 7:
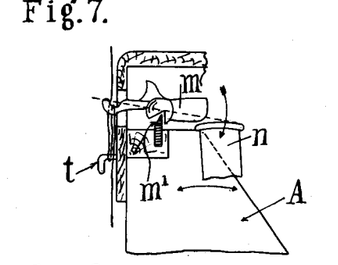
Figs. 7 and 8 illustrate a slight modification in connection with the stop motion.
Figure 8:
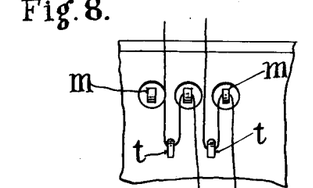

As a modification, I might arrange to dispense with the drop wires $m^3$ (as in Figs. 4, 5 and 6) and cause the oscillating bar $n$ to encounter the tail end of the pivoted finger $m$ hung on the bar $m'$. The pivoted finger $m$ is normally maintained clear of the oscillating bar $n$ by the yarn being passed below a guide $t$ and then partly around the projecting shaped end of said pivoted finger $m$. Immediately an end breaks, the rear end of the finger $m$ falls, and obstructs the oscillating bar $n$, with the same results before described. This modification is clear from the Figs. 7 and 8.

Figure 4:
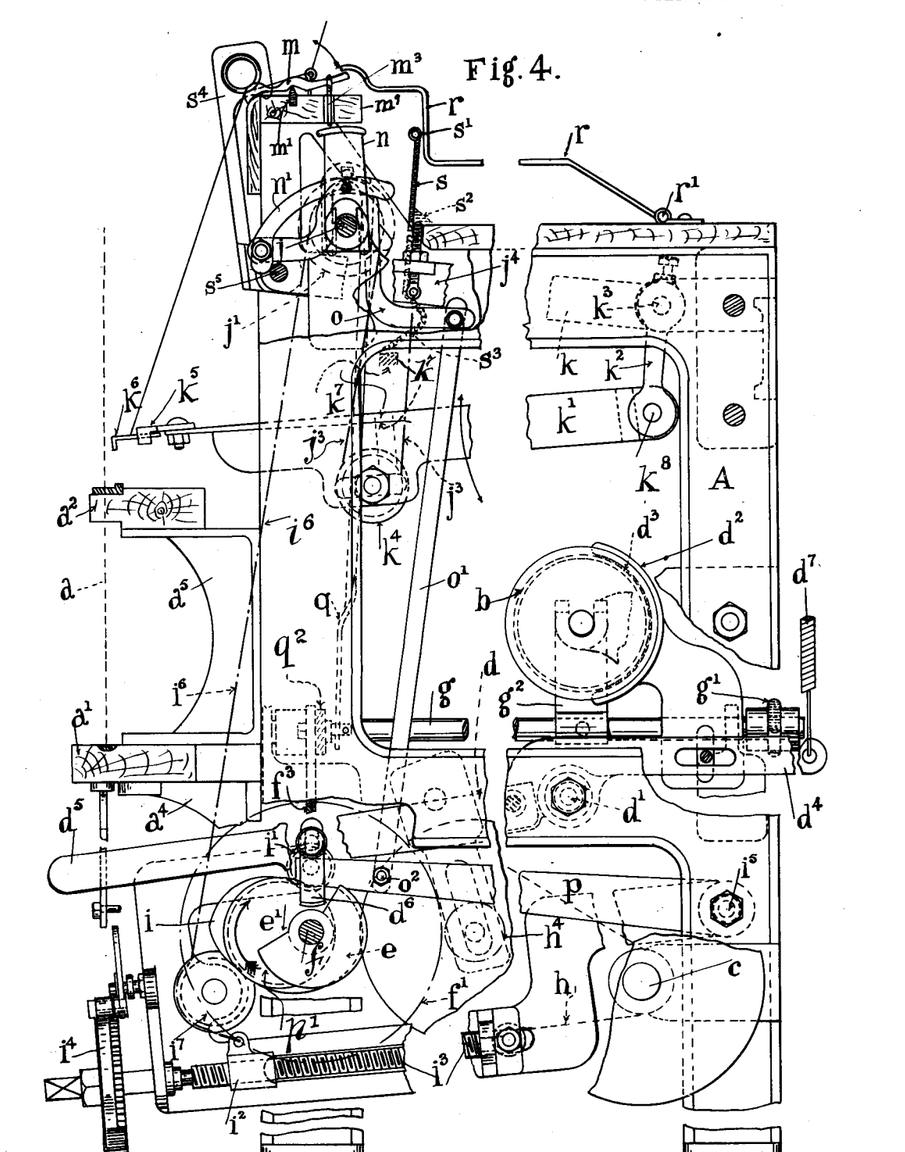
Fig. 4 shows a side elevation of the frame from the right-hand with certain parts broken away and omitted.

In order to automatically stop each frame when the cops are fully wound I may arrange to act on one of the pivoted fingers to depress the rear end. A suitable arrangement is indicated in Fig. 4, and consists of a bent lever $r$, hinged at $r'$, and having its forward end normally sustained just clear of one of said pivoted fingers $m$ when the rear end of such finger is elevated. To the bent lever $r$ is pivoted at $s'$ a lever or limb $s$ with a projection $s^2$ which latches on any convenient part, and the lower end of the lever or limb $s$ is suitably bent or shaped as at $s^3$. When the braced arms $k'$, $k'$ rise sufficiently high, as the cops approach completion, a cross bar $k^7$ on arms $k$ encounters the lower end of the lever or limb $s$ and unlatches the projection $s^2$ and allows the lever $r$ to fall and depress the pivoted finger $m$ and so stop the machine.

To obviate breaking down of the ends when winding on paper tubes, or otherwise, and on completion of the cops, I may arrange to lower the yarn guide bar or rod $k^5$ to direct the yarn for a few turns onto the spindle at a lower level than the base of the cop, and, this can be provided for by suspending the swing frame $k$, $k'$, $k'$, by a pivoted latch or lever $s^4$ pivoted to the member $k$ at $s^5$. When the latch or lever $s^4$ is unhooked, the frame $k$, $k'$, $k'$, turns with the shaft $k^3$ as the center of movement. The chain connection at $j^4$ is lowered along with the supporting arm $k$. Thus by unlocking or disengaging and lowering the latch or lever $s^4$, the yarn guide bar or rod $k^5$ can be lowered below the base of the cop and then by lifting the handle $d^5$ to set the machine in action momentarily a few turns wound on the spindle, all, as will be obvious from the dotted lines seen in Fig. 1.

Figures 16, 17:
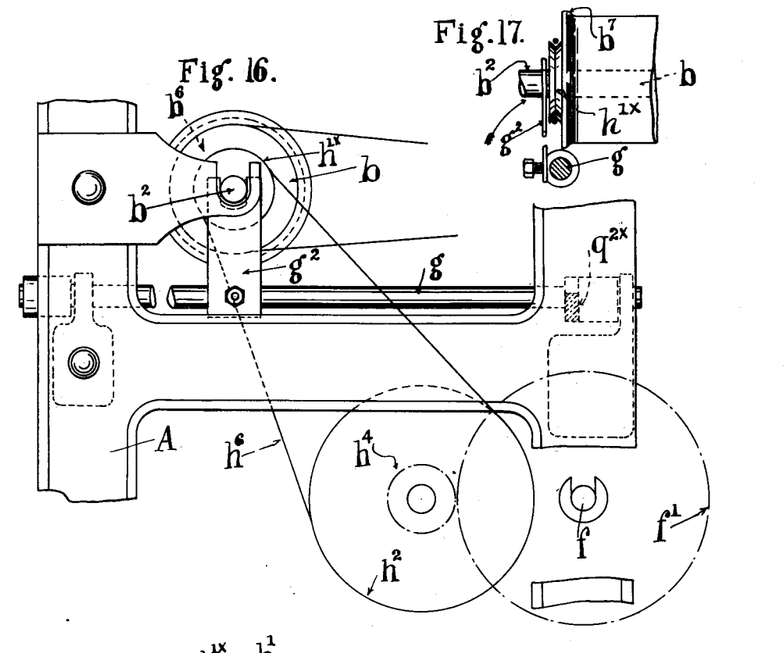
Figs. 16 to 19 illustrate in detail a modified arrangement for driving the lower front shaft according to which said shaft is driven from the tin roller shaft and the use of a clutch on the lower front shaft is dispensed with. The figures are fragmentary views but are sufficient to explain the variation.
Figures 18, 19:
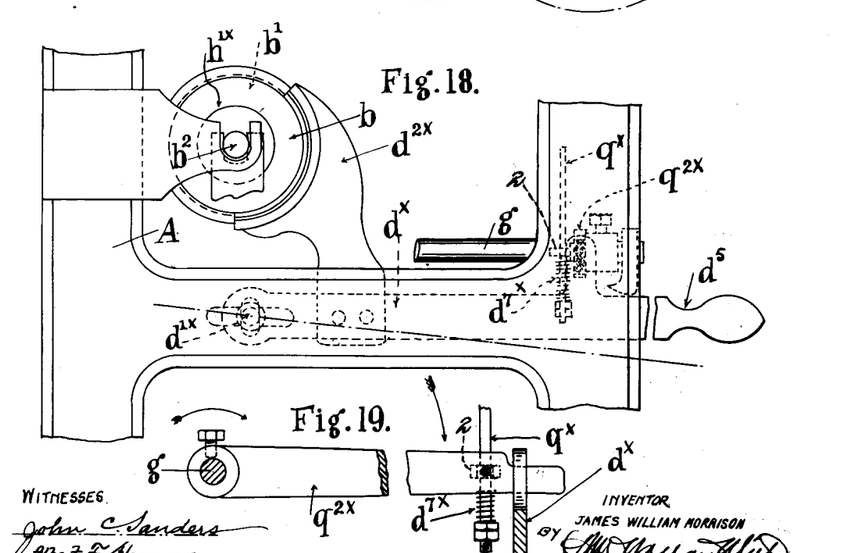

According to the modified arrangement depicted on Sheet 6, Figs. 16 to 19, I drive the pulley $h^2$ by the band $h^6$ direct from a pulley $h'^x$ on the tin roller shaft $b^2$. The tin roller $b$ is moved into gear with a clutch member $b'$, as before, by a fork $g^2$ mounted on the shaft $g$, (see Fig. 17) and the pulley $h'^x$ is fixed to the said tin roller $b$, which tin roller may have a turned up edge $b^7$ to prevent the end driving band running off, as shown in Fig. 17. Rotation of the pulley $h^2$ turns the pinion $h^4$ and so drives the large pinion $f'$. No clutch on the lower front shaft $f$ is needed, because, when the fork $g^2$ moves away from the tin roller, the latter is released and the pulley $h'^x$ is not driven and no motion is communicated to the pulley $h^2$. The clutch fork $g^2$ is moved when the shaft $g$ is rocked and this is brought about by acting on the lever $q^{2x}$, which, in this case, is pinned on the shaft $g$. The lever $q^{2x}$ has an extension which engages the modified form of brake lever $d^x$ pivoted at $d'^x$ and so works such brake lever applying the brake and taking it off when worked by the connecting rod $q^x$. This occurs when an end breaks, or when the cops are fully wound, because, upward movement of the connecting rod $q^x$ works the brake lever $q^{2x}$ and rocks the shaft $g$ to disengage the clutch. In this case I do not propose to arrest the tin roller during the quick drop because for winding some classes of cops or for winding on tubes or bobbins it may be preferable or convenient not to periodically arrest the tin roller during such time as the binding length is put in.

In order to permit the winding of a few coils on the spindles below the built-up cops prior to doffing, following upon lowering of the yarn guide bark $k^5$ by its frame, it is necessary to be able to release the brake lever $d^x$—say, by pressing same down, to take off the brake and to rock the shaft $g$. To allow of this being done, the connecting rod $q^x$ passes through an eye-bolt 2 in the lever $q^{2x}$ and its lower length is backed up by a spring $d^{7x}$ held on by adjustable nuts. Thus, when a set of cops is fully wound, the lever $d^x$ is depressed by hand, by acting on the handle $d^5$ to release the brake and rock the shaft $g$, the spring $d^{7x}$ giving as the lever $q^{2x}$ is slightly pressed down. It is obvious that the stop motion acts through the connecting rod $q^x$ to lift the lever $q^{2x}$ whenever the rocking bar $n$ is obstructed, and the stoppage of the machine is consequently brought about by applying the brake $d^{2x}$ and moving the fork $g^2$ to release the clutch in connection with the tin roller $b$.

Figure 20:
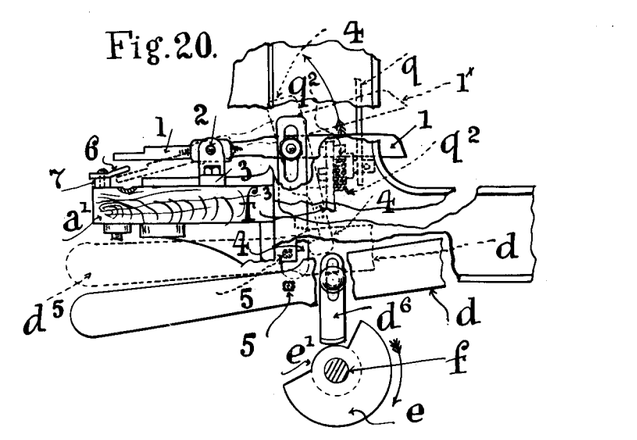
Fig. 20 is a detail elevation indicating how the brake lever may be held out of action or allowed to come into action to give continuous or intermittent winding.
Figure 21:
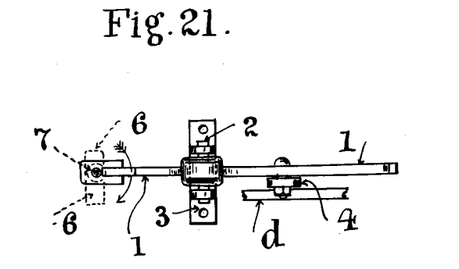
Fig. 21 is a plan view of the holding out lever shown in Fig. 20.

With regard to the construction of winding frame already fully described with reference to Figs. 1, 2, 3 and 4 and the detail views Figs. 5 to 15 such frame can be most simply arranged to give either continuous or intermittent winding just as required, by the adjunct or modification fully shown at Figs. 20 and 21. This end is achieved by the provision of a lever $1^x$ pivoted at 2 on a bracket 3 the lever having a notched catch 4. This notched catch when in one position can engage a pin 5 on the brake lever $d$, and, when in its other or dotted position, is held clear of the pin 5. The pivoted lever $1^x$ can be held clear by means of a turn catch 6 which can be swiveled on a support 7 fixed to the lower spindle support $a'$. The action of the lever $1^x$ can be easily followed. If continuous winding is required the lever $1^x$ is put in operation to lock on the pin 5 and hold the brake lever $d$ elevated clear of the cam $e$ and so the clutch is not disengaged or the brake applied to the tin roller. The result is continuous winding. It will be noted, that, even with the brake lever $d$ so held out of action, the mechanism still is effective for automatic stoppage (as for example when an end breaks) because in that case the rod $q$ when lifted elevates the lever $q^2$, as before, which in turn lifts the lever $1^x$ and so releases the brake lever $d$ altogether. For intermittent winding (i. e. arresting of the spindle alternately) the lever $1^x$ is simply raised out of action and made to occupy the position shown in dotted lines Fig. 20 and is held in that position by the turn catch 6 holding down the outer end of the lever $1^x$. With the lever $1^x$ out of action a condition exists as though such lever $1^x$ were non-existent. The Fig. 21 is a plan view of the pivoted lever $1^x$ and the turn catch, etc.

I declare that what I claim is—

1. In a yarn winding machine of the indicated kind, revoluble spindles, fixed supports for the spindles, a tin roller driving said spindles, an oscillatory frame with yarn guides to lay the yarn on the spindles, means for driving the tin roller, and automatic means for periodically stopping the tin roller whereby the driving of the spindle is arrested while the yarn directing means on the oscillatory frame put in a quickly laid binding thread as set forth.

2. In a yarn winding machine, revoluble spindles, fixed supports for the spindles, driving means for rotating the spindles, yarn directing means to lay the yarn on the spindles, and an oscillatory frame carrying said yarn directing means, and moving through an arc, a fulcrum for said frame, a movable support for said oscillatory frame and a fulcrum for such support and two independent oppositely acting chains controlling the movement of said oscillatory frame to effect the copping, and a rotary chain deflecting device acting on one of said oppositely acting chains and to which the latter chain is attached and which device controls the chase as set forth.

3. In a yarn winding machine, revoluble spindles, fixed supports therefor, a tin roller driving the spindles, an oscillatory frame, a fulcrum therefor, yarn directing means on the said frame, a chain suspending the oscillatory frame, a second chain controlling the movement of said oscillatory frame, a copping motion to which the second chain is attached, mechanism to act on such chain, means for driving the spindles and means for arresting the tin roller whereby the oscillatory frame puts in a quickly laid binding thread as set forth.

4. In a yarn winding machine, revoluble spindles, fixed supports for the same, driving means to rotate the spindles, an oscillatory frame, a fulcrum therefor, a movable support for the oscillatory frame and a fulcrum for such support, yarn directing means on the oscillatory frame, two oppositely acting chains controlling the movement of said frame, a copping motion to which one chain is connected, mechanism acting on this chain, and rotatable means to divert this chain to influence the length of chase as set forth.

5. In a yarn winding machine, revoluble spindles, fixed supports therefor, a tin roller to drive said spindles, yarn directing means, an oscillatory frame carrying the same, a support for the frame, a fulcrum for such support, a suspending chain for the oscillatory frame, a second chain controlling the movement of said frame, mechanism acting on one of said chains to effect the copping, driving means for said spindle actuating tin roller, means for intermittently driving and arresting the same, a cam shaft regulating the laying of the yarn on the cop nose and means for automatically stopping the entire mechanism when an end breaks, all in combination and as set forth.

6. In a yarn winding machine, in combination, revoluble spindles, fixed supports for the spindles, yarn directing means, an oscillatory frame, a support for said frame, a fulcrum for such support, yarn guides on the oscillatory frame, a frame suspending chain, a second chain, a copping motion acting on the second chain, a chase varying device acting on the second chain, driving means for rotating the spindles including a driven tin roller, means for intermittently driving and arresting the same, a cam shaft influencing the laying of the yarn on the cop nose and automatic stoppage and control devices controlled by the first-named yarn guides to stop the mechanism on breakage of an end as herein set forth and shown.

7. In a yarn winding machine, in combination, revoluble spindles, fixed supports therefor, pivoted yarn guides and movable yarn guiding means, an oscillatory frame carrying said movable yarn guiding means and a rock shaft and oscilllating bar comprising a stop motion, lever mechanism to act on said stop motion and actuated by the oscillatory frame, chains acting on said frame, the stop mechanism being controlled by the pivoted yarn guides, as described.

In testimony whereof I have signed my name to this specification in the presence of two subscribing witnesses.

JAMES WILLIAM MORRISON.

Witnesses:
   RICHARD WEBSTER IBBERSON,
   ALFRED STUART YATES.